US012580304B2

(12) United States Patent
Tang et al.

(10) Patent No.: US 12,580,304 B2
(45) Date of Patent: Mar. 17, 2026

(54) LIQUID CRYSTAL ANTENNA

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Guoqiang Tang, Beijing (CN); Jia Fang, Beijing (CN); Yang Zheng, Beijing (CN); Yali Wang, Beijing (CN); Zongmin Liu, Beijing (CN); Feng Qu, Beijing (CN); Biqi Li, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 359 days.

(21) Appl. No.: 17/923,757

(22) PCT Filed: Dec. 23, 2021

(86) PCT No.: PCT/CN2021/140931

§ 371 (c)(1),
(2) Date: Nov. 7, 2022

(87) PCT Pub. No.: WO2023/115475

PCT Pub. Date: Jun. 29, 2023

(65) Prior Publication Data

US 2024/0222856 A1 Jul. 4, 2024

(51) Int. Cl.
*H01Q 1/36* (2006.01)
*H01P 1/10* (2006.01)

(52) U.S. Cl.
CPC ............... *H01Q 1/364* (2013.01); *H01P 1/10* (2013.01)

(58) Field of Classification Search
CPC .. H01Q 21/0075; H01Q 1/48; H01Q 21/0087; H01Q 3/36
See application file for complete search history.

(56) References Cited

U.S. PATENT DOCUMENTS

2018/0217456 A1* 8/2018 Vilenskiy ............... H04B 1/006
2023/0006340 A1* 1/2023 Yang ...................... H01Q 9/045

FOREIGN PATENT DOCUMENTS

CN 105706304 A 6/2016
CN 107528121 A 12/2017

OTHER PUBLICATIONS

Office Action dated Sep. 28, 2025, issued in counterpart Chinese patent application No. 202180004155.0 with English translation (17 pages).

* cited by examiner

*Primary Examiner* — Dameon E Levi
*Assistant Examiner* — Aladdin Abdulbaki
(74) *Attorney, Agent, or Firm* — WHDA, LLP

(57) ABSTRACT

Provided is a liquid crystal antenna, which includes a first substrate and a second substrate which are oppositely arranged; a liquid crystal layer located between the first substrate and the second substrate; a first electrode located on one side of the first substrate close to the liquid crystal layer; a second electrode located on one side of the second substrate close to the liquid crystal layer; a feeder line located on one side of the second substrate far away from the second electrode and electrically connected with the second electrode; an encapsulation layer located between the first substrate and the second substrate and surrounding the liquid crystal layer; and a side electrode assembly including a plurality of side electrodes.

7 Claims, 5 Drawing Sheets

LIQUID CRYSTAL ANTENNA

TECHNICAL FIELD

The present application relates to the technical field of mobile communications, in particular to a liquid crystal antenna.

BACKGROUND

With the continuous development of mobile communication technology, a reconfigurable liquid crystal antenna attracts more and more attention of people. In the related art, a dielectric constant of a liquid crystal layer can be changed by changing a voltage applied to two ends of the liquid crystal layer of the liquid crystal antenna, thus being capable of changing a working frequency of the liquid crystal antenna.

However, when reconfiguring the working frequency of the liquid crystal antenna, liquid crystal molecules in the liquid crystal layer need to return to an initial state by an elastic force of the liquid crystal molecules, which takes a long time, greatly affects the frequency switching efficiency of the liquid crystal antenna, and limits an application range of the liquid crystal antenna.

At present, it is urgent to design a novel liquid crystal antenna to solve the above problems.

SUMMARY

The embodiments of the present application provide a liquid crystal antenna, including

- a first substrate and a second substrate which are oppositely arranged:
- a liquid crystal layer located between the first substrate and the second substrate:
- a first electrode located on one side of the first substrate close to the liquid crystal layer:
- a second electrode located on one side of the second substrate close to the liquid crystal layer;
- a feeder line located on one side of the second substrate far away from the second electrode and electrically connected with the second electrode;
- an encapsulation layer located between the first substrate and the second substrate and surrounding the liquid crystal layer; and
- a side electrode assembly including a plurality of side electrodes.

In some embodiments of the present application, a direction of an electric field formed by the side electrodes in the side electrode assembly intersects with a direction of an electric field formed by the first electrode and the second electrode.

In some embodiments of the present application, the side electrode assembly includes a first side electrode and a second side electrode; and

- the first side electrode and the second side electrode are oppositely arranged and are both located on one side of the encapsulation layer far away from the liquid crystal layer.

In some embodiments of the present application, the side electrode assembly includes a first side electrode and a second side electrode, orthographic projections of the first side electrode and the second side electrode on the first substrate respectively overlap with an orthographic projection of the encapsulation layer on the first substrate, and the orthographic projection of the first side electrode on the first substrate and the orthographic projection of the second side electrode on the first substrate do not overlap with each other.

In some embodiments of the present application, the first side electrode and the second side electrode are oppositely arranged.

In some embodiments of the present application, the first side electrode and the second side electrode are both located on the first electrode and insulated from the first electrode.

In some embodiments of the present application, an orthographic projection of the second electrode on the first substrate overlaps with an orthographic projection of the encapsulation layer on the first substrate; and the first side electrode and the second side electrode are both located on one side of the second electrode far away from the second substrate and insulated from the second electrode.

In some embodiments of the present application, an orthographic projection of the second electrode on the first substrate and an orthographic projection of the encapsulation layer on the first substrate do not overlap each other; and

- the first side electrode and the second side electrode are both located on one side of the second substrate far away from the feeder line, an orthographic projection of the first side electrode on the second substrate and an orthographic projection of the second electrode on the second substrate do not overlap with each other, and an orthographic projection of the second side electrode on the second substrate and the orthographic projection of the second electrode on the second substrate do not overlap with each other.

In some embodiments of the present application, one of the first side electrode and the second side electrode is located on the first electrode and insulated from the first electrode, and the other one of the first side electrode and the second side electrode is located on one side of the second electrode far away from the second substrate and insulated from the second electrode.

In some embodiments of the present application, one of the first side electrode and the second side electrode is located on the first electrode and insulated from the first electrode, the other one of the first side electrode and the second side electrode is located on one side of the second electrode far away from the feeder line, and an orthographic projection of the other one of the first side electrode and the second side electrode and an orthographic projection of the second electrode on the second substrate do not overlap with each other.

In some embodiments of the present application, the encapsulation layer includes two first encapsulation parts which are oppositely arranged and two second encapsulation parts which are oppositely arranged, and the first encapsulation parts are connected with the second encapsulation parts; and

- the first encapsulation part is made of a conducting material, the second encapsulation part is made of an insulating material, the first side electrode is in direct contact with one first encapsulation part, and the second side electrode is in direct contact with the other first encapsulation part.

In some embodiments of the present application, the side electrode assembly includes a first side electrode, a second side electrode, a third side electrode and a fourth side electrode; and

- the first side electrode and the second side electrode are both located on the first electrode and both insulated from the first electrode; and the third side electrode and the fourth side electrode are both located on one side of the encapsulation layer far away from the first substrate.

In some embodiments of the present application, the third side electrode and the fourth side electrode are both located on one side of the second substrate far away from the feeder line:

or, the third side electrode and the fourth side electrode are both located on one side of the second electrode far away from the second substrate and insulated from the second electrode.

In some embodiments of the present application, an orthographic projection of the first side electrode on the first substrate overlaps with an orthographic projection of the third side electrode on the first substrate, and an orthographic projection of the second side electrode on the first substrate overlaps with an orthographic projection of the fourth side electrode on the first substrate.

In some embodiments of the present application, the encapsulation layer includes two first encapsulation parts which are oppositely arranged and two second encapsulation parts which are oppositely arranged, and the first encapsulation parts are connected with the second encapsulation parts; and the first encapsulation part is made of a conducting material, and the second encapsulation part is made of an insulating material; and the first side electrode and the third side electrode are in direct contact with one first encapsulation part, and the second side electrode and the fourth side electrode are in direct contact with the other first encapsulation part.

In some embodiments of the present application, the side electrode assembly further includes a fifth side electrode and a sixth side electrode, the fifth side electrode and the sixth side electrode are oppositely arranged, and the fifth side electrode is located on one side of one first encapsulation part far away from the liquid crystal layer, and the sixth side electrode is located on one side of the other first encapsulation part far away from the liquid crystal layer.

The above description is merely an overview of the technical solutions of the present application, which may be implemented in accordance with the contents of the description in order to make the technical means of the present application more clearly understood. In order to make the above and other objects, features, and advantages of the present application more apparent and comprehensible, preferred embodiments of the present application are set forth below.

BRIEF DESCRIPTION OF THE DRAWINGS

In order to illustrate the technical solutions in the embodiment of the present application or in the related art more clearly, the drawings used in the description of the embodiments or the prior art will be briefly described below. Obviously, the drawings in the following description are merely some embodiments recorded in the present application. For those of ordinary skills in the art, other drawings may also be obtained based on these drawings without going through any creative work.

DETAILED DESCRIPTION OF THE EMBODIMENTS

Figure 1:
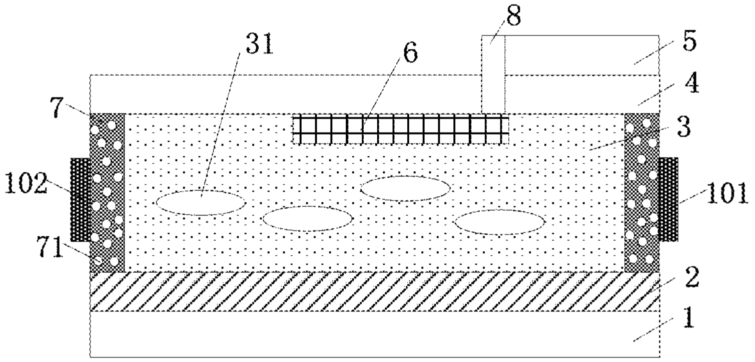
FIG. 1 to FIG. 14 are respectively schematic structural diagrams of fourteen liquid crystal antennas provided in the embodiments of the present application.

Hereinafter, the technical solutions in the embodiments of the present application are illustrated clearly and completely with the accompanying drawings in the embodiments of the present application. Apparently, the described embodiments are merely some but not all of the embodiments of the present application. Based on the embodiments in the present application, all other embodiments obtained by those of ordinary skills in the art without going through any creative work shall fall within the scope of protection of the present application.

In the drawings, the thickness of regions and layers may be exaggerated for clarity. The same reference numerals in the drawings denote the same or similar structures; therefore, the detailed description thereof will be omitted. In addition, the drawings are merely schematic representations of the present application and are not necessarily to scale.

Unless otherwise required by the context, throughout the specification and claims, the term "comprising" is interpreted as an open and inclusive sense, that is, "including, but not limited to". In the description of this specification, the descriptions to the reference terms "one embodiment", "some embodiments", "exemplary embodiments", "examples", "specific examples" or "some examples" mean that the specific features, structures, materials or characteristics described in connection with this embodiment or example are included in at least one embodiment or example of the present application. The schematic representations of the terms used above are not necessarily referring to the same embodiment or example. Furthermore, the specific features, structures, materials, or characteristics may be included in any one or more embodiments or examples in any suitable manner.

In the embodiments of the present application, words such as "first" and "second" are used to distinguish the same items or similar items with basically the same functions and effects, which are only used to clearly describe the technical solutions of the embodiments of the present application, and are not to be construed as indicating or implying any relative importance or a number of indicated technical features.

A reconfigurable antenna means that a relation between each array element in a multi-antenna array may be flexibly changed according to actual conditions, but is not fixed. The reconfigurable antenna mainly realizes the reconfiguration of antenna performances by adjusting a state variable device. The reconfigurable antenna may be classified into a frequency reconfigurable antenna, a directional pattern reconfigurable antenna, a polarization reconfigurable antenna and a multi-electromagnetic parameter reconfigurable antenna according to functions. One or more of various parameters such as frequency, lobe pattern, polarization mode and the like of the antenna may be reconfigured by changing the structure of the reconfigurable antenna. The reconfigurable antenna has become a research hotspot due to the advantages of small size, multiple functions and easy diversity application thereof.

In the frequency reconfigurable antennas, a frequency reconfigurable liquid crystal antenna has received much attention. In the related art, a dielectric constant of a liquid crystal layer may be changed by changing a voltage applied to both ends of the liquid crystal layer of the frequency reconfigurable liquid crystal antenna, thus being capable of changing a working frequency of the frequency reconfigurable liquid crystal antenna. When a working frequency is reconfigured for the liquid crystal antenna, the voltage applied to the two ends of the liquid crystal layer of the liquid crystal antenna needs to be removed first, and when liquid crystal molecules in the liquid crystal layer return to an initial state, another voltage is applied to the two ends of the liquid crystal layer of the liquid crystal antenna again to realize the frequency reconfiguration. However, when reconfiguring the working frequency of the liquid crystal antenna, the liquid crystal molecules in the liquid crystal layer need to return to the initial state by an elastic force of the liquid crystal molecules. This is called relaxation time. The relaxation time is long, which affects a frequency switching efficiency of the liquid crystal antenna, and limits application of the liquid crystal antenna in products.

Based on this, an embodiment of the present application provides a liquid crystal antenna, as shown in FIG. 1, including:

- a first substrate 1 and a second substrate 4 which are oppositely arranged;
- a liquid crystal layer 3 located between the first substrate 1 and the second substrate 4;
- a first electrode 2 located on one side of the first substrate 1 close to the liquid crystal layer 3;
- a second electrode 6 located on one side of the second substrate 4 close to the liquid crystal layer 3;
- a feeder line 5 located on one side of the second substrate 4 far away from the second electrode 6 and electrically connected with the second electrode 6;
- an encapsulation layer 7 located between the first substrate 1 and the second substrate 4 and surrounding the liquid crystal layer 3; and a side electrode assembly including a plurality of side electrodes (for example, 101 and 102).

In an exemplary embodiment, the first substrate 1 and the second substrate 4 may both be flexible substrates; for example, flexible polyimide (PI) or polyethylene glycol terephthalate (PET). Alternatively, the first substrate 1 and the second substrate 4 may both be rigid substrates, for example; glass.

A specific structure of the liquid crystal molecules in the liquid crystal layer 3 is not limited here. It should be noted that the category and performances of the liquid crystal molecules in the liquid crystal layer 3 may be similar to those of liquid crystal molecules in a liquid crystal display panel. For example, the liquid crystal molecules in the liquid crystal layer 3 need to have a low viscosity, so that when a voltage is applied to the second electrode 6 and the first electrode 2, the liquid crystal molecules in the liquid crystal layer 3 have a fast response speed. In addition, the liquid crystal molecules in the liquid crystal layer 3 need to have a high elastic coefficient to help restore an initial state of the liquid crystal by the liquid crystal elasticity after a vertical electric field formed by the second electrode 6 and the first electrode 2 is removed. Moreover, the liquid crystal molecules in the liquid crystal layer 3 are a mixture of a plurality of liquid crystal molecules, so that the liquid crystal layer 3 can satisfy the requirements for different properties.

The second electrode 6 and the first electrode 2 may form a vertical electric field, a strength of the vertical electric field may be adjusted by changing the voltage applied to the second electrode 6 and the first electrode 2, and the change of the strength of the electric field may change a deflection angle of the liquid crystal molecules in the liquid crystal layer 3, so that a dielectric constant of the liquid crystal layer 3 is changed. It may be understood that after the dielectric constant of the liquid crystal layer 3 (as a radiation array) in the liquid crystal antenna is changed, a working frequency of the liquid crystal antenna is changed accordingly. In practical applications, each time the strength of the vertical electric field is adjusted, the liquid crystal molecules in the liquid crystal layer 3 need to return to the initial state, and then deflect again according to a novel electric field.

In an exemplary embodiment, the second electrode 6 may be a patterned electrode layer, or the second electrode 6 may be an integral electrode layer. A specific structure of the second electrode 6 is not limited here, and may be determined according to actual requirements.

A structure of the first electrode 2 may be the same as that of the second electrode 6, or the structure of the first electrode 2 may be different from that of the second electrode 6. The specific structures of the first electrode and the second electrode may be determined according to actual requirements.

In addition, when the first substrate 1 is a flexible substrate, the first electrode 2 may be provided as a planar electrode layer to play an auxiliary supporting role for the liquid crystal laver.

The feeder line 5 refers to a transmission line connecting the electrodes of the liquid crystal antenna and a transceiver.

In an exemplary embodiment, the feeder line 5 is electrically connected with the second electrode 6 through a via hole 8 in the second substrate 4. It may be understood that the via hole 8 is not a hole structure, but a connection electrode formed in the hole structure. Specifically, a penetrating opening is arranged in the second substrate 4, the opening exposes a partial area of the second electrode 6. By forming the connection electrode, the opening is filled and the second electrode 6 is electrically connected with the feeder line 5. Because the connection electrode is formed in the opening, it is called the via hole 8.

Certainly, the feeder line 5 and the second electrode 6 may also be electrically connected by other means, which are not limited herein.

The encapsulation layer 7 is used to fix the first substrate 1 and the second substrate 4 together, and package the liquid crystal layer 3 between the first substrate 1 and the second substrate 4, so as to prevent the liquid crystal molecules in the liquid crystal layer 3 from leaking.

It should be noted that the encapsulation layer 7 may be in direct contact with the first substrate 1 and the second substrate 4, or the encapsulation layer 7 may be in contact with the second electrode 6 or the first electrode 2 on two sides of the liquid crystal layer 3, which is not limited herein and is specifically determined according to the electrode structure on the two sides of the liquid crystal layer 3.

The side electrode assembly includes a plurality of side electrodes (for example, 101 and 102), and is configured to assist the liquid crystal molecules 31 in the liquid crystal layer 3 to return to the initial state in a case where the liquid crystal antenna switches a working frequency.

Figure 2:
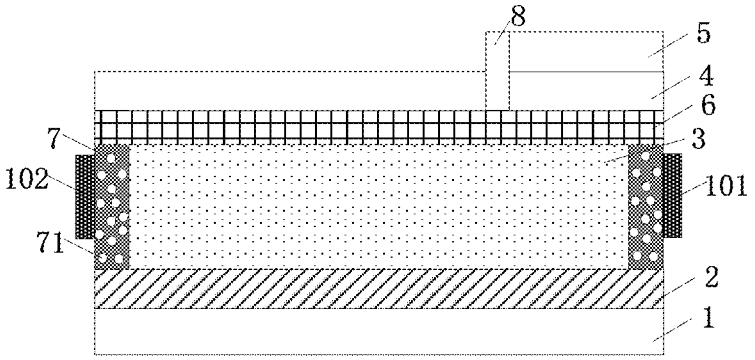

Illustratively, referring to FIG. 1 or FIG. 2, a direction of an electric field formed by the side electrodes (for example, 101 and 102) in the side electrode assembly intersects with a field strength direction of an electric field formed by the first electrode 2 and the second electrode 6.

It should be noted that, in order to make the electric field formed by each side electrode in the side electrode assembly intersect with the electric field formed by the second electrode 6 and the first electrode 2, so that the liquid crystal molecules 31 in the liquid crystal layer 3 can quickly return to the initial state, each side electrode in the side electrode assembly may be located outside the liquid crystal layer 3. For example, an orthographic projection of each side electrode on the first substrate 1 overlaps with an orthographic projection of the encapsulation layer 7 on the first substrate 1, or each side electrode is located on one side of the encapsulation layer 7 far away from the liquid crystal layer 3.

The above-mentioned intersection of the directions of the electric field directions means that: the direction of the electric field formed by the first electrode 2 and the second electrode 6 has a certain included angle with the direction of the electric field formed by the side electrodes in the side electrode assembly, and a specific angle of the included angle is not limited here.

In practical application, field strength directions of the two electric fields are determined by the relative positions of the respective electrodes. For example, as shown in FIG. 2, the first electrode 2 and the second electrode 6 are oppositely arranged in a direction perpendicular to the first substrate 1, and the electric field formed by the two is vertical, and a field strength direction of the electric field is vertical. When positions of the first electrode 2 and the second electrode 6 are determined, the included angle above is determined by positions of the side electrodes in the side electrode assembly.

In an exemplary embodiment, referring to FIG. 1, the initial state of the liquid crystal molecules 31 in the liquid crystal layer 3 is a horizontal state, and when a potential difference between the second electrode 6 and the first electrode 2 is A1 and a vertical electric field is formed, the liquid crystal molecules 31 in the liquid crystal layer 3 deflect in the vertical direction with a deflection angle of a. In this case, the dielectric constant of the liquid crystal antenna is $\alpha$1. When the liquid crystal antenna switches the working frequency thereof, the potential difference between the second electrode 6 and the first electrode 2 is zero, and a voltage is applied to the side electrodes in the side electrode assembly. A direction of an electric field direction formed by the side electrodes (for example, 101 and 102) in the side electrode assembly intersects with the electric field direction of the original vertical electric field. For example, the electric field formed by the side electrodes (for example, 101 and 102) in the side electrode assembly is a horizontal electric field. The horizontal electric field assists the liquid crystal molecules 31 with the deflection angle of a to return to the initial horizontal state, and then a voltage is applied to the second electrode 6 and the first electrode 2, the potential difference between the second electrode 6 and the first electrode is A2, and the liquid crystal molecules 31 in the liquid crystal layer 3 deflect again with a deflection angle of b. In this case, the dielectric constant of the liquid crystal antenna is $\alpha$2. In this way, the dielectric constant of the liquid crystal layer 3 in the liquid crystal antenna changes from $\alpha$1 to $\alpha$2, and a working frequency band of the liquid crystal antenna changes accordingly.

It should be noted that the initial state of the liquid crystal molecules 31 shown in FIG. 1 is a horizontal state. In practical applications, the initial state of the liquid crystal molecules 31 may also be a vertical state or other states. The initial state of the liquid crystal molecules is not limited here, and may be determined according to the actual situations.

In the embodiment of the present application, the side electrode assembly includes the plurality of side electrodes, and when the liquid crystal antenna switches the working frequency, the liquid crystal molecules in the liquid crystal layer 3 are assisted to return to the initial state through the side electrodes, so that the relaxation time is shortened, and the working frequency switching efficiency of the liquid crystal antenna is improved.

In some embodiments of the present application, with reference to FIG. 1 or FIG. 2, the side electrode assembly includes a first side electrode 101 and a second side electrode 102. The first side electrode 101 and the second side electrode 102 are oppositely arranged and are both located on one side of the encapsulation layer 7 far away from the liquid crystal layer 3.

Exemplary, the first side electrode 101 and the second side electrode 102 may be directly fixed on a side face of the encapsulation layer 7 far away from the liquid crystal layer 3.

Exemplary, the encapsulation layer 7 may include two first encapsulation parts which are oppositely arranged. The first encapsulation parts are made of a conducting material, and have conductivity. The first side electrode 101 and the second side electrode 102 are respectively fixed on the two first encapsulation parts. In this way, the two first encapsulation parts having conductivity are equivalent to increasing sizes of the first side electrode 101 and the first side electrode 101. After a voltage is applied to the side electrodes, the liquid crystal molecules 31 in the liquid crystal layer 3 may be completely located in the electric field formed by the side electrode assembly, thus shortening the relaxation time and improving the switching efficiency of the liquid crystal antenna when switching the working frequency.

The material of the first encapsulation part may be doped with conductive particles 71 to make the first encapsulation part conductive. The conductive particles 71 may be gold balls or other microspheres with conductivity.

In an exemplary embodiment, with reference to FIG. 1 and FIG. 2, when the first side electrode 101 and the second side electrode 102 are respectively fixed on the two first encapsulation parts having conductivity, and the first side electrode 101 and the second side electrode 102 are both located on one side of the encapsulation layer 7 far away from the liquid crystal layer 3, an electric field formed by the two first encapsulation parts having conductivity may cover each liquid crystal molecule 31 in the liquid crystal layer 3, which is possible to make the actual sizes of the first side electrode 101 and the second side electrode 102 located outside the encapsulation layer 7 smaller for connection with an external power supply terminal. It may be understood that both the first side electrode 101 and the second side electrode 102 may be used as connection terminals in this case.

Moreover, when the conductive first encapsulation part is provided, the first side electrode 101 and the second side electrode 102 located outside the encapsulation layer 7 are arranged in a form of wires or terminals, so that the relaxation time of the liquid crystal antenna may be shortened, the working frequency switching efficiency of the liquid crystal antenna may be improved, and the situation that the first side electrode 101 and the second side electrode 102 are not firmly fixed outside the encapsulation layer 7 due to oversize can be avoided.

It should be noted that shapes and sizes of the first side electrode 101 and the second side electrode 102 are not limited, but are determined according to the actual situations, and the drawings provided by the embodiments of the present application are only examples.

Exemplarily, the first side electrode 101 and the second side electrode 102 may form a horizontal electric field, and when the liquid crystal antenna needs to switch the working frequency, a voltage can be applied to two ends of the first side electrode 101 and the second side electrode 102 to assist the liquid crystal molecules 31 in the liquid crystal layer 3 to return to the initial horizontal state through the horizontal electric field. It should be noted that the voltage value applied to the two ends the first side electrode 101 and the second side electrode 102 may be determined according to specific conditions, and is not limited here.

In some embodiments of the present application, with reference to FIG. 3 to FIG. 10, the side electrode assembly includes a first side electrode 101 and a second side electrode 102, orthographic projections of the first side electrode 101 and the second side electrode 102 on the first substrate 1 respectively overlap with an orthographic projection of the encapsulation layer 7 on the first substrate 1, and the orthographic projection of the first side electrode 101 on the first substrate 1 and the orthographic projection of the second side electrode 102 on the first substrate 1 do not overlap with each other.

Exemplarily, with reference to FIG. 3, FIG. 4, FIG. 5 and FIG. 6, the first side electrode 101 and the second side electrode 102 are oppositely arranged.

The above-mentioned opposite arrangement of the first side electrode 101 and the second side electrode 102 means that: the first side electrode 101 overlaps with the second side electrode 102 in a direction perpendicular to the second side electrode 102. The meaning of "opposite arrangement" in the embodiments of the present application is similar to the meaning here, and will not be repeated elsewhere.

Figure 3:
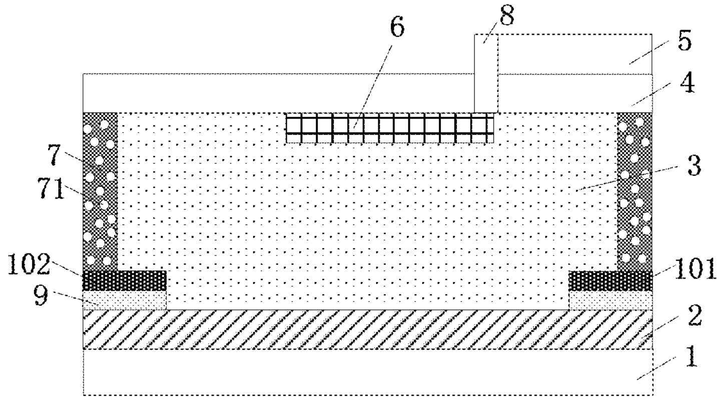
Figure 4:
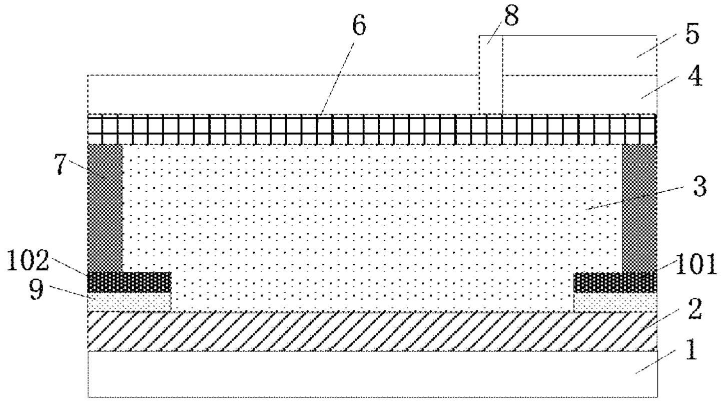

In some embodiments of the present application, with reference to FIG. 3 and FIG. 4, the first side electrode 101 and the second side electrode 102 are both located on the first electrode 2 and insulated from the first electrode 2.

In practical application, a first insulating layer 9 is arranged between the first electrode 2 and the first side electrode 101 and between the first electrode 2 and the second side electrode 102, so that contact between the first electrode 2 and the first side electrode 101 and contact between the first electrode 2 and the second side electrode 102 may be avoided.

In an exemplary embodiment, when the first side electrode 101 and the second side electrode 102 are both located on the first electrode 2 and insulated from the first electrode 2, a part of the encapsulation layer 7 is located between the first side electrode 101 and the second substrate 4, and is in direct contact with the first side electrode 101, and a part of the encapsulation layer 7 is located between the second side electrode 102 and the second substrate 4, and is in direct contact with the second side electrode 102. Within a region of the first electrode 2 not provided with a side electrode, the encapsulation layer 7 is located between the first electrode 2 and the second substrate 4, and is in direct contact with the first electrode 2.

Figure 5:
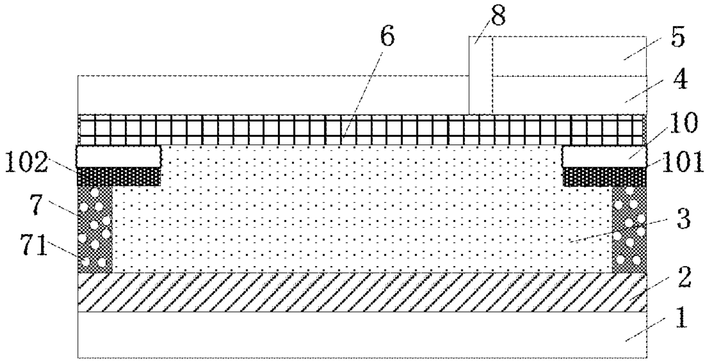

In some embodiments of the present application, with reference to FIG. 5, an orthographic projection of the second electrode 6 on the first substrate 1 overlaps with an orthographic projection of the encapsulation layer 7 on the first substrate 1.

The first side electrode 101 and the second side electrode 102 are both located on one side of the second electrode 6 far away from the second substrate 4 and insulated from the second electrode 6.

In practical application, a second insulating layer 10 is arranged between the second electrode 6 and the first side electrode 101 and between the second electrode 6 and the second side electrode 102, respectively, so as to avoid contact between the second electrode 6 and the first side electrode 101 and contact between the second electrode 6 and the second side electrode 102.

In an exemplary embodiment, since the orthographic projection of the second electrode 6 on the second substrate 4 covers the second substrate 4, the first side electrode 101 and the second side electrode 102 are both arranged between the second electrode 6 and the encapsulation layer 7. In this way, there is an overlapped area between an orthographic projection of the first side electrode 101 on the second substrate 4 and an orthographic projection of the second electrode 6 on the second substrate 4, and there is an overlapped area between an orthographic projection of the second side electrode 102 on the second substrate 4 and the orthographic projection of the second electrode 6 on the second substrate 4.

Figure 6:
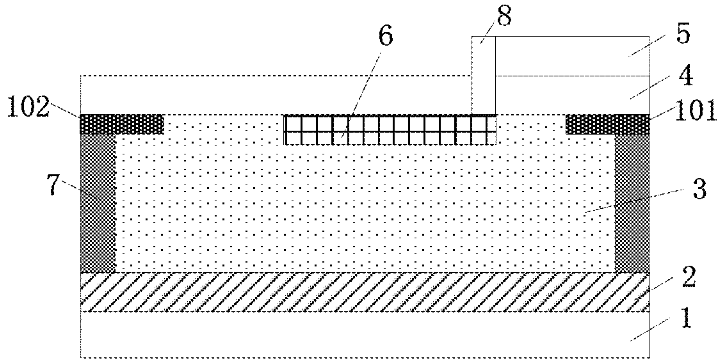

In some embodiments of the present application, with reference to FIG. 6, an orthographic projection of the second electrode 6 on the first substrate 1 and an orthographic projection of the encapsulation layer 7 on the first substrate 1 do not overlap with each other.

The first side electrode 101 and the second side electrode 102 are both located on one side of the second substrate 4 far away from the feeder line 5, an orthographic projection of the first side electrode 101 on the second substrate 4 and an orthographic projection of the second electrode 6 on the second substrate 4 do not overlap with each other, and an orthographic projection of the second side electrode 102 on the second substrate 4 and the orthographic projection of the second electrode 6 on the second substrate 4 do not overlap with each other.

In an exemplary embodiment, since the orthographic projection of the second electrode 6 on the second substrate 4 only covers a central area of the second substrate 4, the first side electrode 101 and the second side electrode 102 may be arranged to be in direct contact with the second substrate 4.

Figure 8:
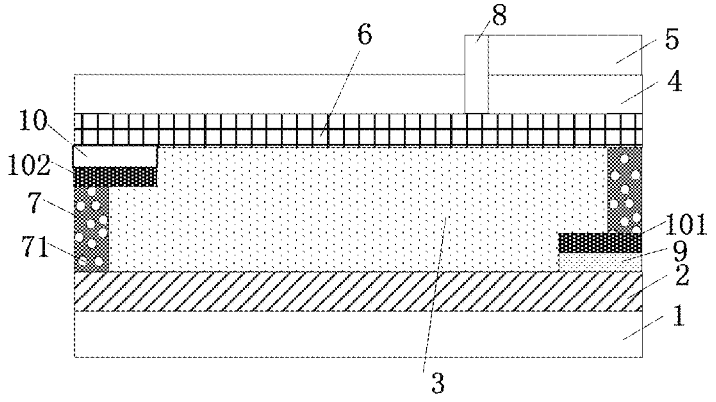

In some embodiments of the present application, with reference to FIG. 8, one of the first side electrode 101 and the second side electrode 102 is located on the first electrode 2 and insulated from the first electrode 2, while the other one of the first side electrode and the second side electrode is located on one side of the second electrode 6 far away from the second substrate 4 and insulated from the second electrode 6.

Figure 7:
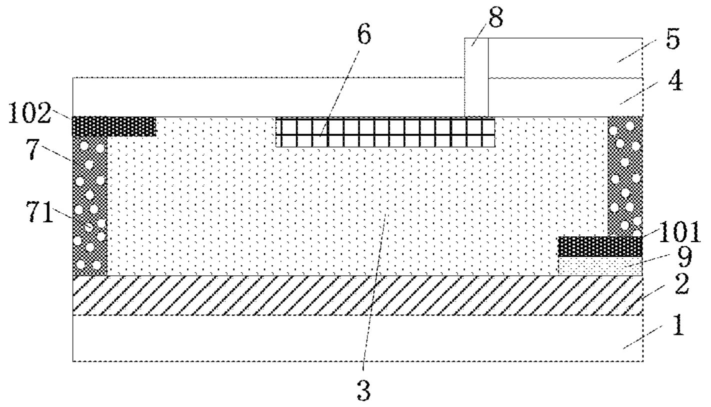
Figure 9:
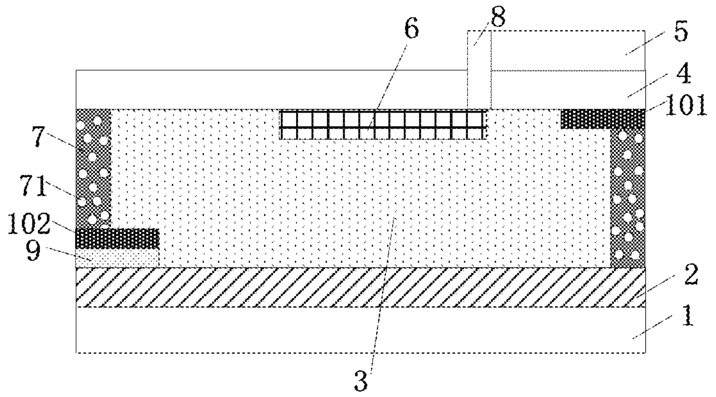
Figure 10:
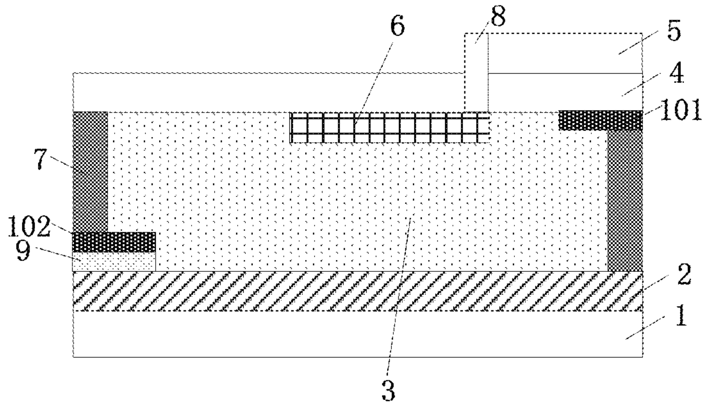

In some embodiments of the present application, with reference to FIG. 7, FIG. 9 and FIG. 10, one of the first side electrode 101 and the second side electrode 102 is located on the first electrode 2 and insulated from the first electrode 2, while the other one of the first side electrode and the second side electrode is located on one side of the second substrate 4 far away from the feeder line 5, and an orthographic projection of the other one of the first side electrode and the second side electrode and an orthographic projection of the second electrode 6 on the second substrate 4 do not overlap with each other.

In some embodiments of the present application, as shown in FIG. 8, when the side electrode assembly includes two side electrodes, one of the side electrodes may be arranged between the liquid crystal layer 3 and the first electrode 2, and the side electrode is insulated from the first electrode 2; the other side electrode is provided between the liquid crystal layer 3 and the second electrode 6 (or the other side electrode is provided between the liquid crystal layer 3 and the second substrate 4 when the orthographic projection of the second electrode 6 on the second substrate 4 covers the central area of the second substrate 4). In this way, a direction of an electric field formed by the two side electrodes in the side electrode assembly is a direction in which the first side electrode 101 points to the second side electrode 102 (or the second side electrode 102 points to the first side electrode 101), so that there is a certain included angle between the direction of the electric field formed by the side electrodes and the direction of the electric field direction formed by the second electrode and the first electrode. After a voltage is applied to the side electrodes, the liquid crystal molecules 31 in the liquid crystal layer 3 quickly return to the initial state under the action of the electric field in combination with the elasticity of the liquid crystal molecules 31, thus reducing the relaxation time of the liquid crystal molecules 31 in the liquid crystal antenna and improving the working frequency switching efficiency of the liquid crystal antenna.

In some embodiments of the present application, with reference to FIG. 1 to FIG. 3, FIG. 5, and FIG. 7 to FIG. 9, the encapsulation layer 7 includes two first encapsulation parts which are oppositely arranged and two second encapsulation parts which are oppositely arranged, and the first encapsulation parts are connected with the second encapsulation parts.

The first encapsulation part is made of a conducting material, the second encapsulation part is made of an insulating material, the first side electrode 101 is in direct contact with one first encapsulation part, and the second side electrode 102 is in direct contact with the other first encapsulation part.

Only the first encapsulation parts having conductivity are drawn in FIG. 1 to FIG. 3, FIG. 5, and FIG. 7 to FIG. 9.

In the embodiment of the present application, the first encapsulation part in the encapsulation layer 7 is made of the conducting material, so that the first encapsulation part having conductivity may also be regarded as a part of the side electrode when the side electrodes are in direct contact with the first encapsulation part, which greatly increases a covering space of the electric field formed by the side electrodes, so that the liquid crystal molecules 31 in the liquid crystal layer 3 may be completely located in the electric field, which is more beneficial for the liquid crystal molecules 31 to return to the initial state, thus shortening the relaxation time of the liquid crystal antenna, and improving the working frequency switching efficiency of the liquid crystal antenna, so that the application field of the liquid crystal antenna is enlarged.

Figure 11:
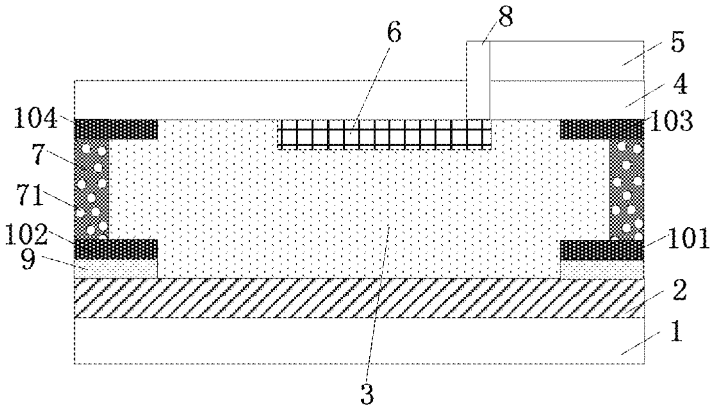
Figure 12:
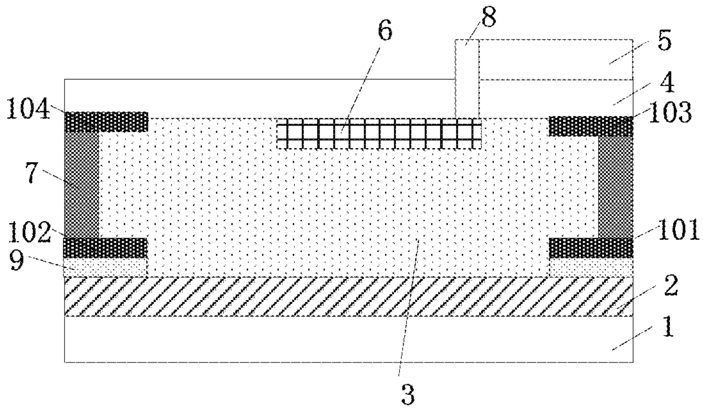

In some embodiments of the present application, with reference to FIG. 11 and FIG. 12, the side electrode assembly includes a first side electrode 101, a second side electrode 102, a third side electrode 103 and a fourth side electrode 104.

The first side electrode 101 and the second side electrode 102 are both located on the first electrode 2 and both insulated from the first electrode 2; and the third side electrode 103 and the fourth side electrode 104 are both located on one side of the encapsulation layer far away from the first substrate 1.

The third side electrode 103 and the fourth side electrode 104 are both located on one side of the encapsulation layer 7 far away from the first substrate 1, including two cases:

in the first case, with reference to FIG. 12, the third side electrode 103 and the fourth side electrode 104 are both located on one side of the second substrate 4 far away from the feeder line 5.

In the second case, the third side electrode 103 and the fourth side electrode 104 are both located on one side of the second electrode 6 far away from the second substrate 4 and insulated from the second electrode 6. In this case, an orthographic projection of the second electrode 6 on the second substrate 4 covers the second substrate 4.

In some embodiments of the present application, with reference to FIG. 11 and FIG. 12, an orthographic projection of the first side electrode 101 on the first substrate 1 overlaps with an orthographic projection of the third side electrode 103 on the first substrate 1, and an orthographic projection of the second side electrode 102 on the first substrate 1 overlaps with an orthographic projection of the fourth side electrode 104 on the first substrate 1.

During actual application, with reference to FIG. 11 and FIG. 12, it is possible to set the voltage values applied to the first side electrode 101 and the third side electrode 103 to be the same, and the voltage values applied to the second side electrode 102 and the fourth side electrode 104 to be the same. In this way, the direction of the electric field formed in this way is parallel to the direction of the first side electrode 101 pointing to the second side electrode 102 and parallel to a direction of the third side electrode 103 pointing to the fourth side electrode 104.

In some embodiments of the present application, with reference to FIG. 11, the encapsulation layer 7 includes two first encapsulation parts which are oppositely arranged and two second encapsulation parts which are oppositely arranged, and the first encapsulation parts are connected with the second encapsulation parts. The first encapsulation part is made of a conducting material, and the second encapsulation part is made of an insulating material.

The first side electrode 101 and the third side electrode 103 are in direct contact with one first encapsulation part respectively, while the second side electrode 102 and the fourth side electrode 104 are in direct contact with the other first encapsulation part respectively.

In this way, since the first encapsulation part has conductivity, with reference to FIG. 11, the first side electrode 101, the third side electrode 103 and the first encapsulation part between the two may be regarded as an integral electrode by applying the same voltage to the first side electrode 101 and the third side electrode 103; and the second side electrode 102, the fourth side electrode 104 and the first encapsulation part between the two may be regarded as another integral electrode by applying the same voltage to the second side electrode 102 and the fourth side electrode 104, so that all the liquid crystal molecules in the liquid crystal layer 3 are located in the electric field, and the field direction of the electric field is almost perpendicular to the field direction of the vertical electric field formed between the first electrode and the second electrode, which is more conducive to shortening the relaxation time of the liquid crystal molecules and improving the working frequency switching efficiency of the liquid crystal antenna.

Figure 13:
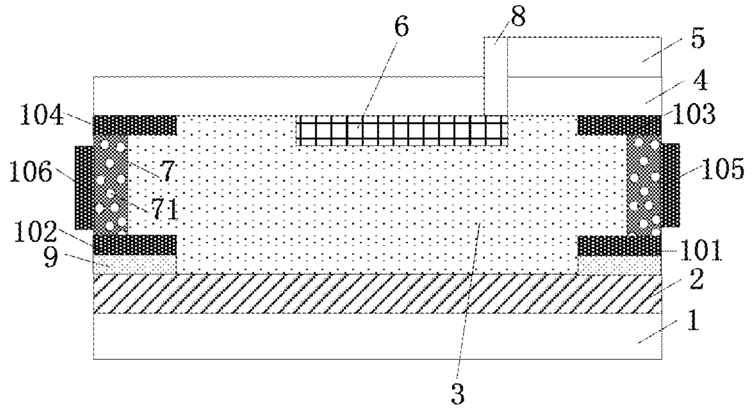
Figure 14:
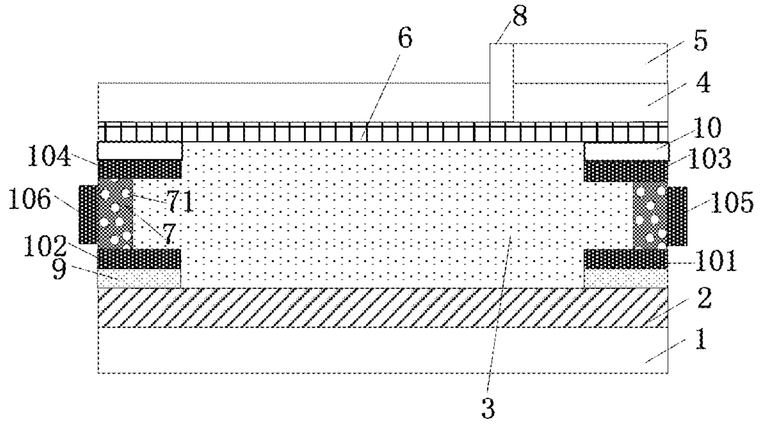

In some embodiments of the present application, with reference to FIG. 13 and FIG. 14, the side electrode assembly further includes a fifth side electrode 105 and a sixth side electrode 106. The fifth side electrode 105 and the sixth side electrode 106 are oppositely arranged, and the fifth side electrode 105 is located on one side of one first encapsulation part far away from the liquid crystal layer 3, and the sixth side electrode 106 is located on one side of the other first encapsulation part far away from the liquid crystal layer 3.

In an exemplary embodiment, with reference to FIG. 13 and FIG. 14, when the fifth side electrode and the sixth side electrode 106 are respectively fixed on the two first encapsulation parts having conductivity, and the fifth side electrode 105 and the sixth side electrode 106 are both located on one side of the encapsulation layer 7 far away from the liquid crystal layer 3, an electric field formed by the two first encapsulation parts having conductivity can cover each liquid crystal molecule 31 in the liquid crystal layer 3, which is possible to make the actual sizes of the fifth side electrode 105 and the sixth side electrode 106 located outside the encapsulation layer 7 smaller for connection with an external power supply terminal. It may be understood that both the fifth side electrode 105 and the sixth side electrode 106 may be used as connection terminals in this case.

Moreover, when the conductive first encapsulation part is provided, the fifth side electrode 105 and the sixth side electrode 106 located outside the encapsulation layer 7 are arranged in a form of wires or terminals, so that the relaxation time of the liquid crystal antenna can be shortened, the working frequency switching efficiency of the liquid crystal antenna can be improved, and the situation that the fifth side electrode 105 and the sixth side electrode 106 are not firmly fixed outside the encapsulation layer 7 due to oversize can be avoided.

It should be noted that here, shapes and sizes of the first side electrode 101, the second side electrode 102, the third side electrode 103, the fourth side electrode 104, the fifth side electrode 105 and the sixth side electrode 106 are not limited here, but are determined according to the actual situations.

In an exemplary embodiment, with reference to FIG. 13, the third side electrode 103 and the fourth side electrode 104 are both located on one side of the second substrate 4 far away from the feeder line 5.

In an exemplary embodiment, with reference to FIG. 14, the third side electrode 103 and the fourth side electrode 104 are located on one side of the second electrode 6 far away from the second substrate 4, and insulated from the second electrode through the second insulating layer 10.

In the embodiment of the present application, by providing the two first encapsulation parts having conductivity and the plurality of side electrodes as shown in FIG. 14, a voltage may be applied to at least one of the plurality of side electrodes located on a left side of the liquid crystal layer 3 and another voltage may be applied to at least one of the plurality of side electrodes located on a right side of the liquid crystal layer 3, so as to form a transverse electric field that intersects with a field direction of the vertical electric field formed between the first electrode and the second electrode, wherein the field direction of the transverse electric field may be determined according to a specific position of the side electrode to which the voltage is applied.

It should be noted that the specific voltage value applied to each side electrode provided by the embodiments of the present application is not limited here, and may be determined according to the actual situations.

The foregoing descriptions are merely detailed embodiments of the present application, but the protection scope of the present application is not limited thereto. Any person skilled in the art can easily think of changes or substitutions within the technical scope of the present application, and all the changes or substitutions should be covered by the protection scope of the present application. Therefore, the protection scope of the present application should be subjected to the protection scope of the claims.

The invention claimed is:

1. A liquid crystal antenna, comprising:

a first substrate and a second substrate which are oppositely arranged;

a liquid crystal layer located between the first substrate and the second substrate;

a first electrode located on one side of the first substrate adjacent to the liquid crystal layer;

a second electrode located on one side of the second substrate adjacent to the liquid crystal layer;

a feeder line located on one side of the second substrate distal to the second electrode and electrically connected with the second electrode;

an encapsulation layer located between the first substrate and the second substrate and surrounding the liquid crystal layer; and a side electrode assembly comprising a plurality of side electrodes, wherein a direction of an electric field formed by the side electrodes in the side electrode assembly intersects with a direction of an electric field formed by the first electrode and the second electrode, wherein the side electrode assembly comprises a first side electrode, a second side electrode, a third side electrode and a fourth side electrode, and the first side electrode and the second side electrode are both located on the first electrode and both insulated from the first electrode; and the third side electrode and the fourth side electrode are both located on one side of the encapsulation layer distal to the first substrate.

2. The liquid crystal antenna according to claim 1, wherein the side electrode assembly comprises a first side electrode and a second side electrode; and the first side electrode and the second side electrode are oppositely arranged and are both located on one side of the encapsulation layer distal to the liquid crystal layer.

3. The liquid crystal antenna according to claim 2, wherein the encapsulation layer comprises two first encapsulation parts which are oppositely arranged and two second encapsulation parts which are oppositely arranged, and the first encapsulation parts are connected with the second encapsulation parts; and the first encapsulation part is made of a conducting material, the second encapsulation part is made of an insulating material, the first side electrode is in direct contact with one first encapsulation part, and the second side electrode is in direct contact with the other first encapsulation part.

4. The liquid crystal antenna according to claim 1, wherein the third side electrode and the fourth side electrode are both located on one side of the second substrate distal to the feeder line;

or, the third side electrode and the fourth side electrode are both located on one side of the second electrode distal to the second substrate and insulated from the second electrode.

5. The liquid crystal antenna according to claim 1, wherein an orthographic projection of the first side electrode on the first substrate overlaps with an orthographic projection of the third side electrode on the first substrate, and an orthographic projection of the second side electrode on the first substrate overlaps with an orthographic projection of the fourth side electrode on the first substrate.

6. The liquid crystal antenna according to claim 5, wherein the encapsulation layer comprises two first encapsulation parts which are oppositely arranged and two second encapsulation parts which are oppositely arranged, and the first encapsulation parts are connected with the second encapsulation parts; and the first encapsulation part is made of a conducting material, and the second encapsulation part is made of an insulating material; and the first side electrode and the third side electrode are in direct contact with one first encapsulation part, and the second side electrode and the fourth side electrode are in direct contact with the other first encapsulation part.

7. The liquid crystal antenna according to claim 6, wherein the side electrode assembly further comprises a fifth side electrode and a sixth side electrode, the fifth side electrode and the sixth side electrode are oppositely arranged, and the fifth side electrode is located on one side of one first encapsulation part distal to the liquid crystal layer, and the sixth side electrode is located on one side of the other first encapsulation part distal to the liquid crystal layer.

* * * * *